United States Patent Office 3,492,107
Patented Jan. 27, 1970

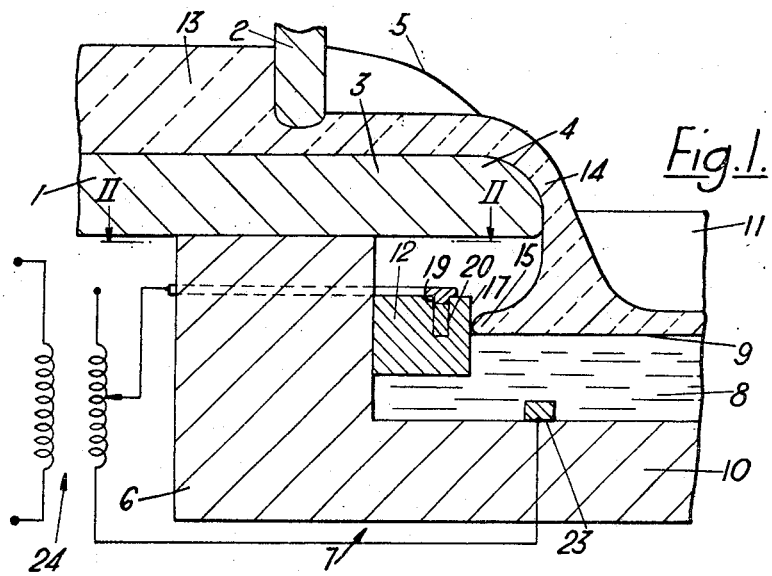
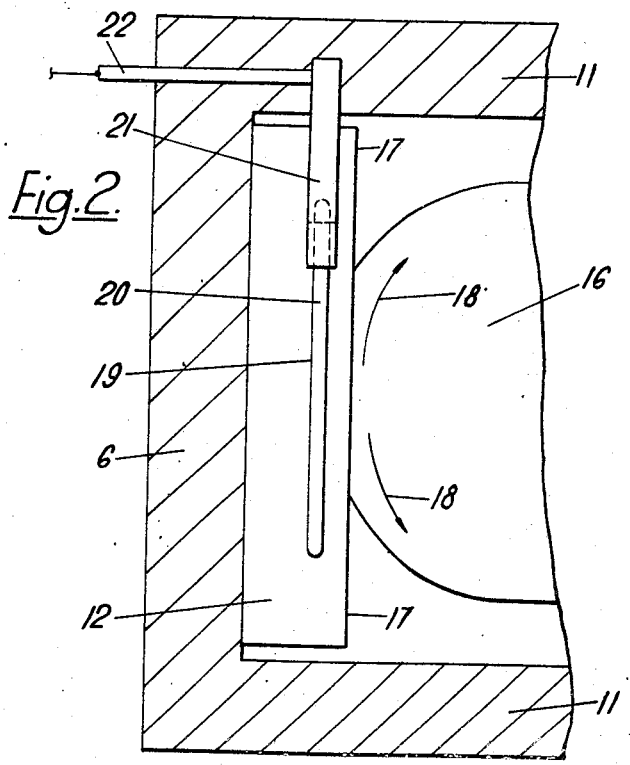

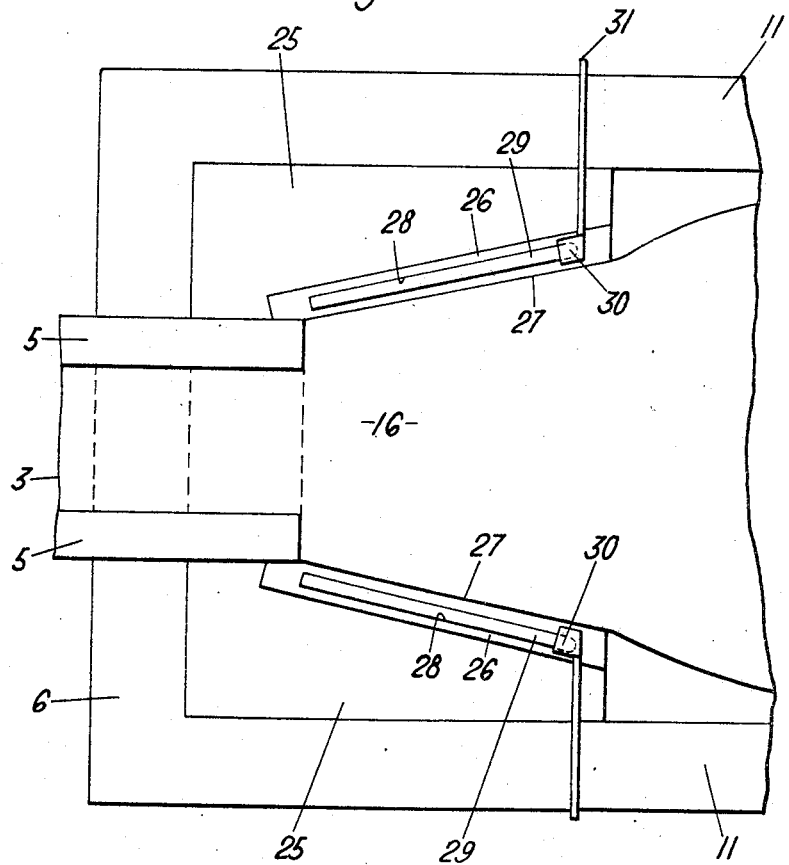

3,492,107
METHOD AND APPARATUS FOR PRODUCING FLOAT GLASS UTILIZING ELECTRICALLY RESISTIVE REFRACTORY CONFINING WALLS
Basil Simpson, Kirk Sandall, near Doncaster, John Mac-Dougall, St. Helens, and Robert Arthur Thompson, Sprotborough, near Doncaster, England, assignors to Pilkington Brothers Limited, Liverpool, England, a corporation of Great Britain
Filed Aug. 24, 1967, Ser. No. 663,109
Claims priority, application Great Britain, Sept. 9, 1966, 40,455/66
Int. Cl. C03b *18/02*
U.S. Cl. 65—99    6 Claims

ABSTRACT OF THE DISCLOSURE

In the float process for the manufacture of flat glass on a bath of molten metal, the viscosity of molten glass flowing against an electrically resistive refractory confining wall is controlled by employing the surface region of that wall as an electrical resistance heater. Electrical current is passed through the confining wall and directly through the molten metal bath to a point beneath the layer of the molten glass floating on the bath.

BACKGROUND OF THE INVENTION

Field of the invention

This invention relates to the manufacture of flat glass and more especially to methods and apparatus for manufacturing flat glass in ribbon form in which molten glass is delivered at a controlled rate to a bath of molten metal to form a layer of molten glass on the bath, which layer is advanced in ribbon form along the bath and is cooled as it is advanced until it is sufficiently stiffened to be taken unharmed from the bath by mechanical means.

The bath of molten metal is preferably a bath of molten tin or a tin alloy having a specific gravity greater than the glass and in which tin predominates. For example the bath is so constituted as to have all the characteristics fully described in U.S. Patent Nos. 2,911,759 and 3,083,551.

It is the main object of the present invention to provide improved localised control of the thermal conditioning and consequently of the viscosity of the molten glass on the bath of molten metal in any region of the bath where the molten glass is in thermal contact with a confining wall.

SUMMARY

According to the invention there is provided a method of manufacturing flat glass in ribbon form in which molten glass is delivered at a controlled rate to a bath of molten metal to form a layer of molten glass on the bath, which layer is advanced in ribbon form along the bath and is cooled as it is advanced, characterised by controlling the viscosity of the glass where it flows against a confining wall by employing the surface region of the wall against which the glass flows as an electrical resistance heater from which there is controlled thermal transfer to the glass.

This invention is based on the principle that some refractory materials and in particular fusion cast refractories can themselves be used as electrical resistance through which heating current can be passed under the conditions existing in flat glass manufacture, and by suitable disposition of electrodes or electrical connections made to the refractory material the path of heating current through the refractory material can be controlled in order to employ the surface region of the wall against which the glass flows as an electrical resistance heater and thereby ensure the desired thermal conditions in the glass which touches that wall. For example, it may be desirable for there to be an enhanced flow of glass along the wall and this flow is assisted by reducing the viscosity of a thin layer of the glass in contact with the wall by thermal transfer from the heated surface of the refractory material to the glass.

In the manufacture of flat glass in ribbon form during which the glass is advanced along a bath of molten metal and molten glass is poured at a controlled rate to the bath and is then advanced along the bath in ribbon form, some of the molten glass delivered to the bath may be permitted to flow in a direction away from the direction of advance of the ribbon to form a heel of molten glass covering the inlet end of the bath and in order to avoid any possibility of stagnancy of the glass in that heel there is a transverse flow of molten glass substantially at right angles to the direction of advancement of the glass ribbon along the bath, against a confining wall which is the inner face of the end wall of the tank structure over which wall the molten glass is delivered to the bath. The invention further provides for the enhancing of that transverse flow in the heel of molten glass by employing the surface region of the wall as an electrical resistance heater. This ensures that there is continuous replacement of the glass in the heel by fresh molten glass which is being delivered to the bath so that there is no glass in a stagnant condition in the heel.

In another method according to the invention, molten glass is poured onto a bath of molten metal at a controlled rate to establish a body of molten glass on the bath, which body is contained laterally as that body of molten glass is advanced between laterally confining surfaces.

The molten glass which is contained between the laterally confining surfaces settles on the bath as it is advanced between those surfaces so that it adopts level surfaces both on the under surface which is in contact with the bath of molten metal and the upper surface, before the glass is released from that lateral constraint as it is further advanced to develop an advancing layer of glass in ribbon form which is then cooled sufficiently to enable it to be taken unharmed from the bath. According to the invention the laterally confining surfaces between which the body of molten glass is contained are employed as electrical resistance heaters in order to enhance the marginal flow of the body of glass against those surfaces.

There is thus a greatly reduced tendency of the advancing body of molten glass to drag against the surfaces because of the possibility, by the use of the invention, of employing the surfaces themselves as heaters which ensure in marginal layer of hot glass of low viscosity flowing down along each of the laterally confining surfaces.

The invention further comprises apparatus for use in the manufacture of flat glass in ribbon form comprising a tank strulture containing a bath of molten metal, means for pouring molten glass onto the bath at a controlled rate to establish a layer of molten glass on the bath, a confining wall of electrically resistive refractory material mounted in the tank structure so as to restrict a flow of the molten glass in the layer, said wall dipping into the molten metal bath, and an electrode mounted on top of the wall over the region of the wall surface to be touched by the glass, whereby on connection of said electrode and the bath to a source of electric current, heating current flows through that surface region of the wall.

In one application of the invention to the region of the tank structure beneath a spout pouring molten glass onto the bath the pouring means is a spout overlapping one end wall of the tank structure and disposed in spaced relation with the plane of the intended level of the bath of molten metal, that end wall of the tank structure is lined with a facing of electrically resistive refractory material which extends below the bath level, and an electrode is electrically connected to said facing along the top of the facing near to the exposed surface of the facing.

In a further apparatus according to the invention in which an advancing body of molten glass on the bath is laterally confined between surfaces as it is advanced prior to being released to effect lateral flow of the molten glass, the apparatus comprises restricting walls extending along the bath to contain the molten glass as it is poured onto the bath and advanced as a body of molten glass between said restricting walls, which walls are constituted by a facing of electrically resistive refractory material which extends below the bath level, and wherein each wall has an electrode which is electrically connected to the wall along the top of the facing near the inner surfaces of the walls against which, in operation, the margins of the body of the molten glass flow.

BRIEF DESCRIPTION OF THE DRAWINGS

FIG. 1 is a sectional elevation of apparatus according to the invention, illustrated by way of example, as applied to the inlet end wall of a tank structure containing a bath of molten metal, and showing a spout for pouring molten glass onto the bath, FIG. 2 is a section on line II—II of FIG. 1, and FIG. 3 is a plan view of the inlet end of a tank structure showing a spout for pouring molten glass onto the bath and laterally confining surfaces for confining a body of molten glass on the bath as it is advanced along the bath, those surfaces being constructed as electrical resistance heaters according to the invention.

In the drawings, the same references indicate the same or similar parts.

DESCRIPTION OF THE PREFERRED EMBODIMENT

Referring to FIG. 1 of the drawings a forehearth of a continuous glass melting furnace is indicated at 1 and a regulated tweel at 2. The forehearth ends in a spout 3 comprising a lip 4 and side jambs 5 which together with the lip form a spout of generally rectangular cross-section. A cover not shown, is fitted over the spout in well-known manner.

The spout 3 is disposed over the inlet end wall 6 of a tank structure the inlet end of which is indicated generally at 7 and which contains a bath 8 of molten metal, for example molten tin or a molten tin alloy having a specific gravity greater than the specific gravity of molten glass and in which tin predominates. The level of the surface of the bath 8 of molten metal is indicated at 9.

The tank structure containing the bath comprises a floor 10 and side walls 11. The outlet end of the tank structure over which a ribbon of glass is discharged from the bath of molten metal is not shown, and the tank structure supports a roof structure bridging the tank structure and providing a tunnel over the bath which defines a headspace over the bath. The roof structure is not shown, but is as described in the aforementioned patents. A protective atmosphere is fed into the headspace as a protection against the ingress of ambient atmosphere into the headspace over the bath.

The inlet end wall 6 of the tank structure is lined with a facing tile of electrically resistive refractory material. The facing tile 12 lines the inlet end wall 6 of the tank structure and is partly submerged below the level of the surface 9 of the molten metal bath. As shown in FIG. 2 the length of the tile 12 is such that it extends across practically the whole width of the tank structure, and the tile is sufficiently wide to extend away from the end wall 6 of the tank structure for some distance beneath the spout 3.

Molten glass produced in the melting tank is discharged from the melting tank along the forehearth 1 and a head of molten glass 13 is held back on the forehearth by the tweel 2. A controlled flow of molten glass flows under the tweel 2 and over the spout lip 4 as indicated at 14. The vertical spacing of the spout lip 4 from the surface 9 of the molten metal bath is of the order of a few inches and is such as to ensure a heel 15 of molten glass being formed behind the glass pouring from the spout to the bath surface, which heel extends rearwardly under the spout lip 4 to the inner face of the refractory tile 12.

The main part of the molten glass pouring from the spout onto the surface of the bath of molten metal flows forwardly along the bath to form a layer of molten glass 16 on the bath which layer is advanced in ribbon form along the bath and is cooled as it is advanced until it is sufficiently stiffened to be taken as a cooled ribbon of glass off the bath of molten metal. The heel 13 which touches the inner face 17 of the tile 12 is continuously supplied from the molten glass pouring over the spout lip 4 and there is a transverse displacement of the glass in the heel, indicated by the arrows 18 in FIG. 2, which displacement constitutes a continuous lateral flow of the molten glass from the heel into the marginal regions of the layer of molten glass on the bath from which the ribbon of glass is being developed by lateral flow of the molten glass on the bath.

By means of the employment of the refractory tile 12 as an electrical resistance heater the transverse flow 18 of molten glass to each side of the heel is enhanced.

Along the top of the facing tile 12 near to the exposed front surface 17 electrical connection is made to the top of the tile. In order to make this connection a groove 19 is cut into the top surface of the tile near to the front surface 17 and the bottom of the groove is at about the same level as the surface level 9 of the molten metal bath. The groove 19 extends along the whole of that part of the tile which is touched by molten glass as shown in FIG. 2. The groove 19 is filled with a molten electrical conductive material 20, for example molten tin, at least to a level approximately the same as the level of the upper surface of the heel 15, and an electrical connector 21 of graphite has a tongue which fits into one end of the groove. The connector 21 is fixed to a connecting rod 22 of heat resistant metal which extends through the tank structure. Two or more similar connectors 21 spaced apart along the groove may be employed, being connected in common to the electric power supply.

The electrically resistive refractory material from which the electrically resistive refractory tile 12 is constituted is such that at the working temperature at the inlet end of the tank structure that is the temperature of about 1,000° C. or above its resistivity is of the order of 10 to 1,000 ohms per centimeter cube. The tile also has a low thermal conductivity, a good resistance to thermal shock and its specific gravity is preferably less than that of the molten metal of the bath and it is chemically resistant both to the glass and to the molten metal of the bath.

Preferred materials are fusion cast refractories, for example cast materials having a high alumina content. A particularly suitable material has been found to be the fusion cast aluminous refractory known under the trade name Monofrax M. Other materials which provide an effective electrical resistance are zirconia-based refractories, for example those known as ZAC refractories.

A graphite electrode 23 is immersed in the bath of molten metal and may be part of an L-shaped block fixed over the side wall of the tank structure in order to make contact with the molten metal of the bath. As the tile 12 extends well below the surface level of the bath there is a preferred electrical path for flow of heating current between the electrode constituted by the molten metal in the groove 19 and the electrode 23 immersed in the bath. This flow is through the front part of the tile 12 so that the surface region of the tile against which the molten glass flows as indicated at 18 acts as an electrical resistance heater so that the molten glass 18 is flowing against an electrically heated surface. The low thermal conductivity of the material of the tile and the width of the tile ensure that heat generated by this current flow is dissipated mainly at the front face 17 of the tile.

The molten glass reaching the region of the surface 17 of the tile may have lost heat since it fell from the spout but the presence of the electrically heated surface 17 of the tile ensures a reduction in viscosity of at least a thin layer of the glass in the heel 15 which is flowing against the tile 17 thereby enhancing the transverse flows 18 of molten glass in the heel and ensuring that there is a continuous flow of molten glass into and out of the heel so that no possibility of stagnancy of glass in the heel exists.

The distance between the groove 19 and the front surface 17 of the tile determines the effective electrical resistance being heated by the current flow. In order to change the heating effect the tile 12 may be replaced by a tile in which the groove is located at a different distance from the front face.

As shown in FIG. 1, the connector 22 and the electrode 23 are connected to the secondary winding of a power supply transformer 24. The connecting rod 22 of heat resisting steel is connected to a variable tapping on the secondary winding so as to enable the voltage between the electrodes to be regulated up to about 100 volts for example. The heaing current flowing through the facial region of the tile 12 is thus accurately controlled so controlling the thermal transfer to the glass in the heel which has flowed towards the surface 17 of the refractory tile and is then flowing transversely against that confining wall. Alternatively a D.C. supply may be used.

Another application of the invention is illustrated in FIG. 3 in which the tank structure at the inlet end of the bath includes a fixed refractory wall structure 25 which extends to the full depth of the tank and is built into the tank structure as a permanent fixture. The inside faces of the wall structure 25 are constituted by facing tiles 26 of electrically resistive refractory material of the same kind as that employed for the tile 12 of FIGS. 1 and 2. The front surfaces 27 of the facing tiles 26 act as laterally confining surfaces which contain the body of molten glass 16 advancing down the passage between the laterally confining surfaces 27 of the restricting walls. The titles 26 of refractory material in effect act as laterally spaced extensions of the side jambs 5 of the spout.

In the top surface of each of the facing tiles 26 there is formed a groove 28 in the same way as the groove 19 is formed in the tile 12. Each groove 28 is filled with a molten electrically conductive material, for example molten tin 29, and in the downstream ends of the tiles 26 there are fitted electrical connectors 30 of graphite which fit into the grooves and are connected to the ends of connection rods 31 of heat resisting metal which extend outwardly through the side walls of the tank structure. There may be more than one connector 30 fitted into each groove. An electrode, not shown, but similar to the electrode 23 is immersed in the molten metal in the region underneath the inlet end of the tank structure and as the tiles 26 dip well down into the molten metal of the bath there is a preferred electrical path for current supplied between the bath and the electrodes constituted by the molten material 29 in the grooves which preferred path is through the surface region of the confining walls so that these surface regions act as electrical resistance heaters, and the surfaces 27 of the refractory walls are subjected to controlled electrical heating so controlling the temperature and hence the viscosity of the margins of the body of molten glass 16 so that body advances between the walls prior to its lateral spreading to form a layer of molten glass which is thereafter advanced in ribbon form down the bath.

The controlled resistance heating of the inner facial regions of the tiles 26 permits reduction of the viscosity of the margins of the body of molten glass so as to enhance the marginal flow of molten glass and thereby assist the advancing of the body of molten glass uniformly along the passage defined between the outwardly splayed surfaces 27.

Separate control of the heating of the faces of the tiles 26 may be employed to give enhanced flow at one side of the body of molten glass 16 in order to control the direction of flow of the spreading layer of molten glass on the bath beyond the downstream end of the tiles.

The invention thus provides for accurate thermal control of molten glass flowing against a confining surface in the manufacture of flat glass during which the glass is advanced along a bath of molten metal and can be applied anywhere in the tank structure where hot molten glass is touching or flowing against a confining wall, by providing that wall with a facing of electrically resistive refractory material according to the invention with appropriate electrical connections in order that the surface of the facing which is touched by the molten glass acts as an electrical resistance heater.

We claim:

1. A method of manufacturing flat glass in ribbon form comprising forming a bath of molten metal in an elongated chamber having a confining wall of electrically resistive refractory material near one end, delivering molten glass at a controlled rate to the bath near said end to form a layer of molten glass on the bath, a portion of which layer flows against said refractory material, and passing electrical current through said refractory confining wall in proximity to said portion of the layer of molten glass and directly through said bath to a point beneath the layer of molten glass to control the viscosity of the glass where it flows against the surface of said refractory wall.

2. A method as in claim 1 wherein said portion is a heel portion and wherein said wall is disposed rearwardly of said heel.

3. A method as in claim 1 wherein there are provided two of said portions each being a lateral margin of said layer, and said electrical current is passed through a refractory confining wall disposed laterally of each margin.

4. Apparatus for use in the manufacture of flat glass in ribbon form comprising an elongated tank structure containing a bath of molten metal, means for pouring molten glass on to the bath near one end of the tank structure at a controlled rate to establish a layer of molten glass on the bath, a confining wall of electrically resistive refractory material mounted in the tank structure near said end so as to restrict a flow of the molten glass in the layer, said wall dipping into the molten metal bath and rising above it to contact the glass, an electrode contacting said refractory material at a point spaced from the bath, and an electrode contacting said bath, whereby, on connection of said electrodes to a source of electric current, heating current flows through said refractory material and directly through said bath to a ponit beneath the layer of molten glass.

5. Apparatus according to claim 4, wherein the pouring means is a spout overlapping the end wall of the tank structure at said one end and disposed in spaced relation with the plane of the intended level of the bath of molten metal, and wherein said refractory material forms a forwardly disposed facing on said end wall.

6. Apparatus as in claim 4 further comprising a pair of opposite lateral confining walls, and wherein said refractory material forms a lateral facing for each of said pair of opposite lateral confining walls and wherein each wall contains an electrode contacting the refractory material.

References Cited

UNITED STATES PATENTS

| 2,928,212 | 3/1960 | Long | 65—203 |
| 3,294,517 | 12/1966 | Fraser et al. | 65—346 |
| 3,351,452 | 11/1967 | Robinson | 65—182 |
| 3,445,214 | 5/1969 | Ormesher | 65—182 |

S. LEON BASHORE, Primary Examiner

E. R. FREEDMAN, Assistant Examiner

U.S. Cl. X.R.

65—65, 182, 203, 356